(12) United States Patent
Hall et al.

(10) Patent No.: US 10,681,761 B2
(45) Date of Patent: Jun. 9, 2020

(54) APPARATUS FOR DISTRIBUTING SHORT-RANGE WIRELESS SIGNALS USING AN INTERCONNECTION PROTOCOL FOR ELECTRONIC DEVICES

(71) Applicants: David R. Hall, Provo, UT (US); Mark Hall, Springville, UT (US); John Robinson, Spanish Fork, UT (US); Joe Fox, Spanish Fork, UT (US)

(72) Inventors: David R. Hall, Provo, UT (US); Mark Hall, Springville, UT (US); John Robinson, Spanish Fork, UT (US); Joe Fox, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 15/601,413

(22) Filed: May 22, 2017

(65) Prior Publication Data

US 2018/0338331 A1     Nov. 22, 2018

(51) Int. Cl.
| | |
|---|---|
| *H01Q 1/00* | (2006.01) |
| *H04W 76/15* | (2018.01) |
| *H04B 7/04* | (2017.01) |
| *H04L 29/08* | (2006.01) |
| *H04W 56/00* | (2009.01) |
| *H04W 4/80* | (2018.01) |
| *H04W 76/11* | (2018.01) |

(52) U.S. Cl.
CPC .............. *H04W 76/15* (2018.02); *H04B 7/04* (2013.01); *H04L 67/322* (2013.01); *H04W 4/80* (2018.02); *H04W 56/0015* (2013.01); *H04W 76/11* (2018.02)

(58) Field of Classification Search
CPC ......... H04N 21/4307; H04N 21/43615; H04N 21/43637
USPC .............................................. 455/562.1, 575.7
See application file for complete search history.

(56) References Cited

U.S. PATENT DOCUMENTS

| | | | |
|---|---|---|---|
| 2006/0256031 A1* | 11/2006 | Bae ........................ | H01Q 1/362 343/895 |
| 2009/0074051 A1* | 3/2009 | Manapragada ....... | H04L 65/607 375/240 |
| 2018/0054838 A1* | 2/2018 | Cariou .................. | H04W 76/10 |

* cited by examiner

*Primary Examiner* — Tu X Nguyen

(57) ABSTRACT

An apparatus for distributing data using a short-range wireless interconnection protocol for electronic devices includes a processor communicatively connected, using a communication bus, to a number of originator antennas, each of the number of originator antennas communicating with an originating device, a plurality of device antennas, communicatively connected to the communication bus, each of the plurality of device antennas communicating with a number of client devices, and a non-transitory storage medium. The non-transitory storage medium includes a receive module, a session identify module, and a send module. The receive module receives a data packet using one of the number of originator antennas. The session identify module identifies at least one communication session with at least one remote device associated with one of the plurality of device antennas. The send module sends the data packet to the at least one remote device associated with one of the plurality of device antennas.

20 Claims, 6 Drawing Sheets

Priority One
440

Priority Two
441

Priority Three
442

Priority Four
443

Fig. 4

APPARATUS FOR DISTRIBUTING SHORT-RANGE WIRELESS SIGNALS USING AN INTERCONNECTION PROTOCOL FOR ELECTRONIC DEVICES

TECHNICAL FIELD

The disclosure relates generally to the propagation of Bluetooth® wireless signal. Specifically, the disclosure relates to an apparatus for propagating Bluetooth® wireless signal to multiple devices.

BACKGROUND

Bluetooth® uses a method called bonding for recognizing specific devices and thus enabling control over which devices are allowed to connect to each other. Devices then can establish a connection without user intervention. A bond is created through a process called "pairing". The pairing process is typically triggered by a specific request to create a bond from a user via a user interface.

Pairing typically involves some level of user interaction. This user interaction is the basis for confirming the identity of devices. Once pairing successfully completes, a bond will have been formed between the two devices, enabling those two devices to connect to each other in the future without again requiring the pairing process. When desired, the bonding relationship can later be removed by the user.

Once two devices are paired, they may communicate using Bluetooth® wireless communication. A device may be able to bond with a finite number of other devices. For example, a hands-free device in a car may only be able to bond with one other device.

BRIEF SUMMARY

An apparatus for distributing data using Bluetooth® communication protocol includes a processor communicatively connected to a processor, a communication bus, a number of originator antennas, a plurality of device antennas, and a non-transitory storage medium. Each of the number of originator antennas communicates with an originating device. Each of the plurality of device antennas communicates with a number of client devices. The non-transitory storage medium includes a receive module, session identify module, and a send module. The receive module receives a data packet using one of the number of originator antennas. The session identify module identifies at least one communication session with at least one remote device associated with one of the plurality of device antennas. The send module sends the data packet to the at least one remote device associated with one of the plurality of device antennas.

A method for distributing data to a number of client devices using an apparatus for distributing data using Bluetooth® communication protocol. The method includes receiving, from an originating device, a data packet. The data packet is data to be sent to a client device. The method includes identifying, based on the data packet, a communication session. The communication session provides information on communication of the data packet to the client device. The method includes sending, using at least one of a plurality of device antennas, the data packet to a client device. At least one of the originator antennas and or the device antennas may comprise a helical microstrip antenna as disclosed in co-pending U.S. patent application Ser. No. 15/391,071, entitled Broadband Helical Microstrip Antenna, teachings of which are incorporated herein in their entirety by this reference.

BRIEF DESCRIPTION OF THE DRAWINGS

A more particular description of the invention briefly described above is made below by reference to specific example. Several examples are depicted in drawings included with this application. An example is presented to illustrate, but not restrict, the invention.

FIG. 4 illustrates a number of priority categories for communication sessions between an originating device and a plurality of client devices.

DETAILED DESCRIPTION

Figure 1:
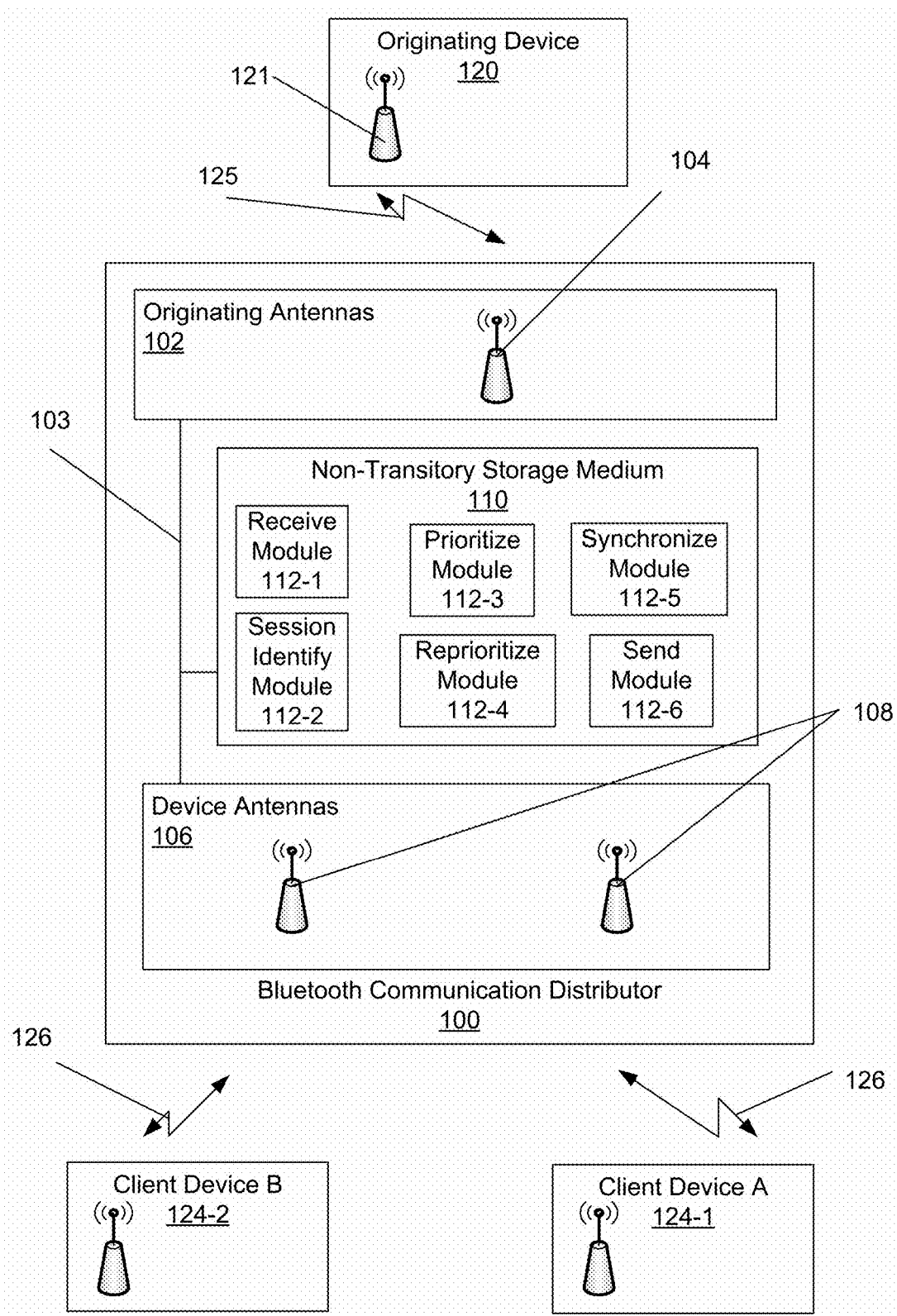
FIG. 1 illustrates a diagram of a Bluetooth® Communication Distributor using an originating antenna and a plurality of device antennas.

A detailed description of the claimed invention is provided below by example, with reference to examples in the appended figures. Those of skill in the art will recognize that the components and steps of the invention as described by example in the figures below could be arranged and designed in a wide variety of different configurations without departing from the substance of the claimed invention. Thus, the detailed description of the examples in the figures is merely representative of an example of the invention, and is not intended to limit the scope of the invention as claimed.

For purposes of this disclosure, the modules refer to a combination of hardware and program instructions to perform a designated function. Each of the modules may include a processor and memory. The program instructions are stored in the memory, and cause the processor to execute the designated function of the modules. Additionally, a smartphone app and a corresponding computer system may be used to implement a module, or a combination of modules.

For purposes of this disclosure, short-range wireless interconnection protocol for electronic devices includes but is not limited to Bluetooth® wireless technology, which is a low cost, low power short range frequency link for mobile devices and for Local Area Network access points; Bluetooth® wireless technology offers fast and reliable digital transmissions of data over the globally available 2.4 GHz (Industrial, Scientific, and Medical) bandwidth.

A purpose of the claimed methods, apparatuses, and computer program products is to facilitate the communication between a number of originating devices and a plurality of client devices using Bluetooth® wireless communication protocols. In one example, an originating device communicates with four client devices. In another example, two originating devices communicate with six client devices. Each originating device may communicate with each client device.

For purposes of this disclosure as used in the present specification and in the appended claims the term "Bluetooth®," as used herein, is not limited to apparatus and methods which strictly comply with the official Bluetooth® specification, but generally includes all apparatuses and methods which provide information exchange over short-range radio links.

As used in the present specification and in the appended claims, the term a number refers to one or more of an item. Zero not being a number, but rather, the absence of a number.

As used in the present specification and in the appended claims, the term a plurality refers to two or more of an item.

As used in the present specification and in the appended, the term communication refers to the imparting or exchange of information.

As used in the present specification and in the appended claims, the term communication session refers to a series of interactions between two communicating endpoints called a connection. A connection is maintained by while the two end points are communicating back and forth in a conversation of some duration.

As described above, a myriad of problems complicate the communication of data between an originating device and a client device. In one example, the originating device may be limited as to the number of client devices with which it may connect. In another example, two originating devices may communicate with and share a plurality of client devices. The limitation on the number of connections and originating device may have with client devices limits the usage of the client device in some systems.

A Bluetooth® communication distributor may allow a number of originating devices to communicate with a plurality of client devices. The Bluetooth® communication distributor may allow for larger video screens, more speakers in an audio system, or a greater variety of client devices. A Bluetooth® communication distributor may allow a number of originating devices to share a number of client devices, such as a number of speakers. A Bluetooth® communication distributor may simplify and expand the usage of originating devices in some systems. The Bluetooth® communication distributor may reduce updating software or hardware on an originating device or the client devices.

Referring now to the figures, FIG. 1 illustrates a diagram of a use for Bluetooth® communication distributor (100) facilitating communication between an originating device (120) and a number of client devices (124). The originating device (120) uses an antenna (121) and wireless communication (125) to communicate with the Bluetooth® communication distributor (100). The Bluetooth® communication distributor (100) processes the data and communicates the data to a number of client devices (124) using wireless communication (126).

The originating device (120) is a computing device capable of wireless communication. The originating device may be a general purpose computer, a smart device, or a specialized device for producing data. The originating device (120) may communicate with a number of different client devices. Client devices may receive the same data, such as sound. Client devices may receive a portion of data, such as video. The Bluetooth® communication distributor (100) may control a number of communication sessions between the originating device (120) and the client devices (124).

The Bluetooth® communication distributor (100) includes a number of originating antennas (102), a non-transitory storage medium (110), and a number of device antennas (106). The originating antennas (102) receive wireless communication from an originating device (120). The originating antennas (102) include a number of individual antennas (104). Each individual antenna (104) may be limited as to the number of originating devices (120) with which it may communicate. At least one of the originator antennas and or the device antennas may comprise a helical microstrip antenna as disclosed in co-pending U.S. patent application Ser. No. 15/391,071, entitled Broadband Helical Microstrip Antenna, teachings of which are incorporated herein in their entirety by this reference.

A non-transitory storage medium (100) includes a number of modules (112). Each module (112) may consist of a combination of hardware and software. Each module may include a processor capable of executing computer program code. The processor associated with each module may cause the module to execute computer program code to perform a particular task. The computer program code may include instructions stored as part of software or hardware.

As illustrated, the non-transitory storage medium (110) includes a receive module (112-1), a session identify module (112-2), a prioritize module (112-3), a reprioritize module (112-4), a synchronize module (112-5), and a send module (112-6).

The receive module (112-1) causes the Bluetooth® communication distributor (112-1) to receive data using an originating antenna (102) from an originating device (120). The data received may include a specialized format such as audio or video. A series of receive data may be connected by a client device (124) to provide audio or video to a user. The data received may be computer communication data to facilitate the transfer of information from an originating device (120) to a client device (124).

The session identify module (112-2) examines the data received from the originating device (120) to identify a communication session between the originating device (120) and a client device (124). The session identify module (112-2) may identify a session based on the type of data received from the originating device (120). The session identify module (112-2) may identify a session based on recent activity between an originating device (120) and a client device (124). The session identify module (112-2) may identify a number of sessions to use to send the data to a number of client devices (124).

The prioritize module (112-3) may prioritize communication sessions between the originating device (120) and a client device (124). The priority of the sessions may determine a client device (124) that receives the data from the originating device (120). The priority of the session may affect delays and bandwidth in communicating between the originating device (120) and the client device (124).

The reprioritize module (112-4) may reprioritize communication sessions based on events after a session priority has been set. For example, sessions may be re-prioritized when a new session between an originating device (120) and a client device (124) is established.

A synchronize module (112-5) may provide for coordination of the communication of data to client devices (124). In one example, data is sent simultaneously from device antennas (106) to client devices (124) to provide audio from two client devices (124). In another example, a first audio stream to a first client device (124-1) is synchronized with a second audio stream to a second audio device (124-2) to provide a stereo or surround sound effect.

A send module (112-6) sends data to a number of client devices (124). The send module (112-6) may use a number of antennas (108) to transmit the data to client devices (124) to synchronize the transmission of data. The device antennas (106) may be used due to limitations in the Bluetooth® protocol as to how many devices one antenna (108) may connect with.

The Bluetooth® communication distributor (100) includes a number of device antennas (106). The device antennas (106) include a number of individual antennas (108) each individual device antenna (108) may be used to communicate with a client device (124). The Bluetooth® communication distributor (100) includes a plurality of antennas (108) to communicate with client devices (124). At least one of the originator antennas and or the device antennas may comprise a helical microstrip antenna as disclosed in co-pending U.S. patent application Ser. No. 15/391,071, entitled Broadband Helical Microstrip Antenna, teachings of which are incorporated herein in their entirety by this reference.

An overall example according to FIG. 1 will now be given. The originating device (120) generates data for the client devices (124). The originating device (120) uses an antenna (121) to communicate using Bluetooth® wireless technology to the Bluetooth® communication distributor (100). At least one of the originator antennas and or the device antennas may comprise a helical microstrip antenna as disclosed in co-pending U.S. patent application Ser. No. 15/391,071, entitled Broadband Helical Microstrip Antenna, teachings of which are incorporated herein in their entirety by this reference.

The Bluetooth® communication distributor (100) uses an antenna (104) that is one of the number of originating antennas (102) to receive the data from the originating device (120). The number of modules (112) stored on the non-transitory storage medium (110) process and transmit the data to the client devices (124).

The receive module (112-1) is used to receive the data from the originating device (120). The receive module (112-1) identifies that the data was intended for the Bluetooth® communication distributor (100). The receive module (112-1) formats received data for processing by the Bluetooth® communication distributor (100).

The prioritize module (112-3) identifies that the data received from the originating device (120) is intended for two client devices (124). The prioritize module (112-3) prioritizes client device A (124-1) above client device B (124-2)

The reprioritize module (112-4) examines the data received and determines that it is to be sent to both client device A (124-1) and client device B (124-2). The reprioritize module (112-4) sets the priority of the communication session with client device A (124-1) and client device B (124-2) to be equal.

The synchronize module (112-5) synchronizes the transmission of data to client device A (124-1) and client device B (124-2). In this example an audio stream for a left speaker is prepared for transmission to client device A (124-1), and an audio stream for a right speaker is prepared for transmission to client device B (124-2).

The send module (112-6) sends the audio stream for client device A (124-1) to client device A (112-1). The send module (112-6) uses the synchronize module (112-5) to synchronize the transmission of data to the client devices (124).

Figure 2:
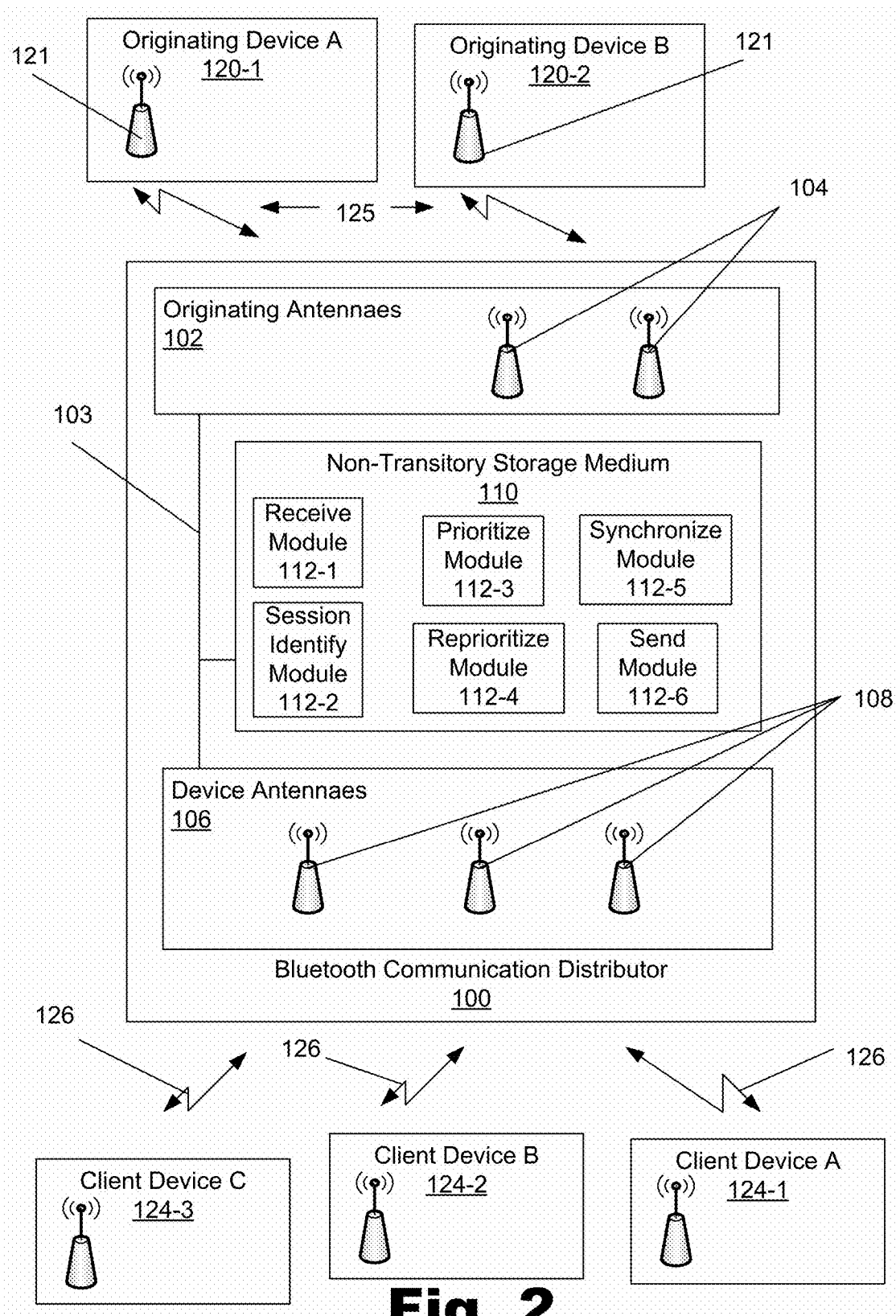
FIG. 2 illustrates a diagram of a Bluetooth® Communication Distributor using a number of originating antennas and a plurality of device antennas.

FIG. 2 illustrates a diagram of a use for a Bluetooth® communication distributor (100) facilitating communication between an originating device (120) and a number of client devices (124). As described above, the Bluetooth® communication distributor (100) processes the data from a number of operating devices (120) and communicates the data to a number of client devices (124) using wireless communication (126).

As described above the Bluetooth® communication distributor (100) includes originating antennas (102), device antennas (106), and a non-transitory storage medium (110) communicatively connected by a bus (103). The non-transitory storage medium (100) includes a receive module (112-1), a session identify module (112-2), a prioritize module (112-3), a reprioritize module (112-4), a synchronize module (112-5), and a send module (112-6).

An overall example according to FIG. 2 will now be given. Originating device A (120-1) generates audio traffic that is intended for client device A (124-1) and client device C (124-3). Originating device A (120-1) broadcasts the audio traffic using a wireless communication technology (125) to the Bluetooth® communication distributor (100). In this example, originating device A (120-1) broadcasts a single copy of the audio traffic. The receive module (112-1) receives the audio traffic using a first originating antennas (102). The session identify module (112-2) identifies that the audio traffic is part of a session that is replicated on both client device A (124-1) and client device C (124-3). The prioritize module (112-3) prioritizes the traffic based on the session and the type of data. In this example the data is audio traffic which indicates a time sensitive component to the delivery of the audio traffic.

When a client device is added or deleted the priority of the session is reprioritized. In this example, a fault in client device C causes client device C (124-3) to become unavailable for a period of time. The priority of traffic in the session may be raised to ensure that client device A (124-1) receives consistent audio traffic. When client device C (124-3) again becomes available the audio traffic is reprioritized by the reprioritize module (124-4). When client device A (124-1) and client device C (124-3) are both receiving audio traffic, the synchronize module (112-5) synchronizes the transmission of data to client device A (124-1) and client device C (124-3). Synchronizing the data allows client device A (124-1) and client device C (124-3) to emit audio output simultaneously to provide improved audio quality to a listener. The send module (112-6) is used by the synchronize module (112-5) to send data packets, including audio traffic, using device antennas (106) to client device A (124-1) and client device C (124-4).

While the originating device A (120-1) is transmitting audio traffic to client device A (124-1) and client device C (124-3), originating device B (120-2) is transmitting video traffic to client device B (124-2). Originating device B (120-2) transmits, using a wireless signal (125) video traffic to the Bluetooth® communication distributor (100). The Bluetooth® communication distributor (100) uses the receive module (112-1) to receive the video traffic using a second originating antenna (102). The session identify module (112-2) identifies that the video traffic is intended for client device B (124-2). The prioritize module (112-3) prioritizes the video traffic to be at a lower priority than the audio traffic sent by originating device A (120-1). The reprioritize module (112-4) on the video traffic to improve the bandwidth and transmission of the audio traffic. The synchronize module (112-5) in this example synchronizes the video traffic with the audio traffic, which allows the Bluetooth® communication distributor (100) to create a multimedia presentation from two originating devices using three client devices. The synchronize module (112-5) uses a device antenna (106) to broadcast the video traffic to client device B (124-2) using wireless communication technology (126).

Figure 3:
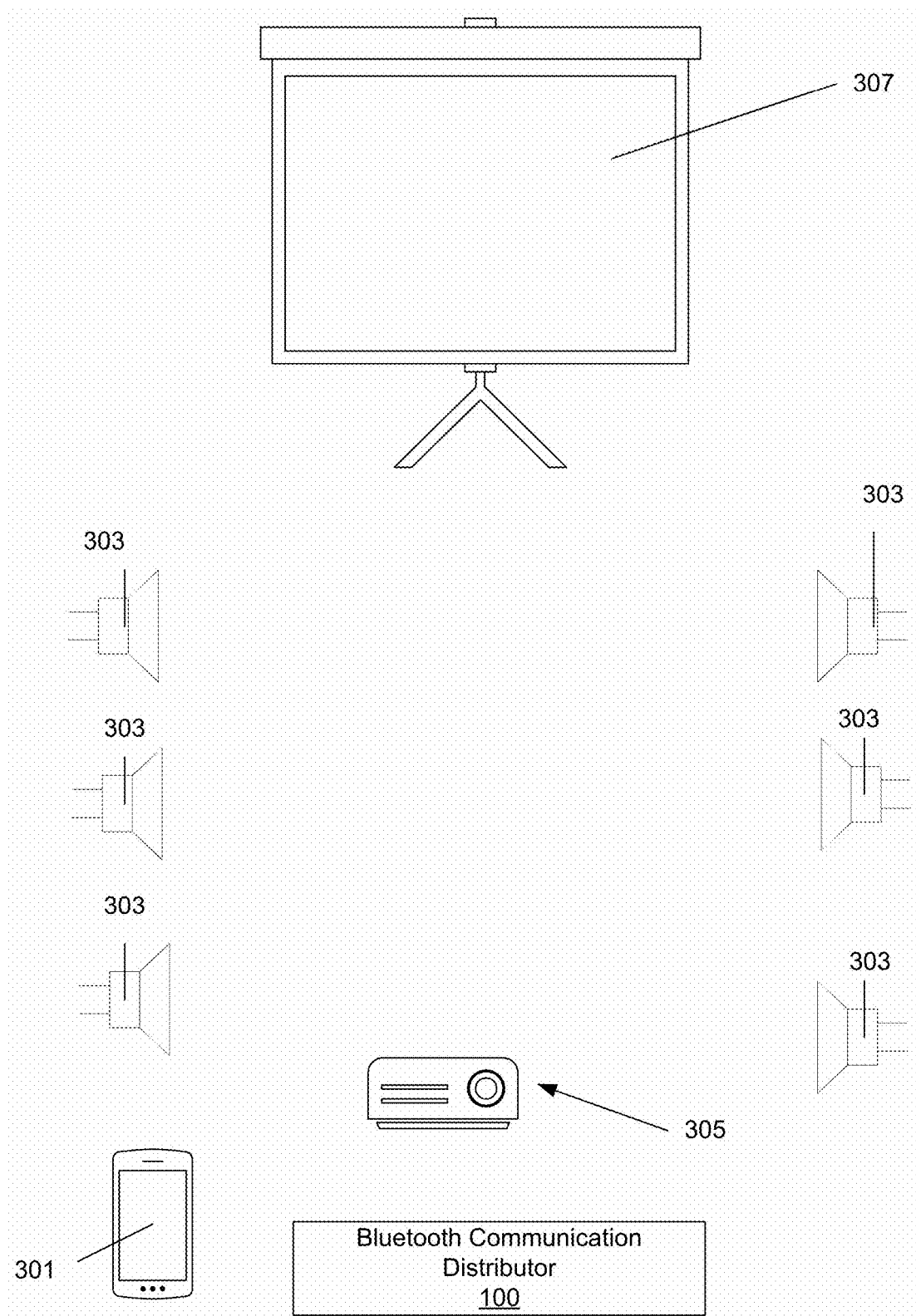
FIG. 3 illustrates a system using a Bluetooth® Communication Distributor to distribute data using Bluetooth® Wireless communication from an originating device to a plurality of client devices.

FIG. 3 illustrates a smart phone (301) communicating through a Bluetooth® communication distributor (100) to a number of Bluetooth® enabled client devices (303, 305). In this example the client devices include a number of audio speakers (303) and a video projector (305). The smart phone (300) transmits a signal that includes audio and video data. The Bluetooth® communication distributor (100) receives the data transmitted by the smart phone (301). The Bluetooth® communication distributor (100) identifies a communication session that sends the audio output to the number of speakers (303) and the video output to the video projector (305). The Bluetooth® communication distributor (100) prioritizes the audio output above the video output. The Bluetooth® communication distributor (100) synchronizes the transmission of the audio output with frames of the video output. At some times, the video output may be dropped to synchronize the video output presented with the audio output. The Bluetooth® communication distributor (100) then transmits the audio output to the audio speakers (303) and the video output to the video projector (305). The video projector (305) projects the video to a screen (307). The observation of the video output is synchronized with the projection of the audio output.

FIG. 4 illustrates a number of priority bands that may be used by the Bluetooth® communication distributor (100). The Bluetooth® communication distributor (100) may attribute different attributes to each priority band. As illustrated, there are four priority bands, priority one (440), priority two (441), priority three (442), and priority four (443). Each priority band shares a sense of urgency and attributes of what occurs if immediate transmission of the data is not possible.

In one example priority one (440) data traffic is transmitted first and consistently. This gives the highest probability of consistent delivery in both time and reliability. Priority one (440) traffic is deemed most important in the operation of the Bluetooth® communication distributor (FIG. 1, 100). Priority one (440) traffic is sensitive to a user for timely distribution. In this example audio traffic is assigned to priority one (440).

Continuing this example, priority two (441) traffic is video traffic. Video traffic in priority two (441) is transmitted after audio traffic. The transmission of video traffic is considered important; however, when video traffic cannot be transmitted, it may be dropped, or not transmitted to allow for the transmission of later arrived video traffic. This may cause a video to appear to pause while the audio material continues to play. When the Bluetooth® distribution device (FIG. 1, 100) is able to transmit both the audio traffic that is priority one (440) and video traffic that is priority two (441), the video traffic will be synchronized with the audio traffic that is being transmitted.

Priority three (442) traffic indicates data traffic that is used to control auxiliary devices. This data traffic is of lower priority than priority two (441) traffic, but also may be dropped and synchronized in a similar fashion to the priority two (441) traffic.

Priority four (443) traffic represents data transmission traffic. Data transmission traffic does not have a real-time or pseudo-real-time component. Data traffic as part of priority four (443) traffic is transmitted when the Bluetooth® communication device (FIG. 1, 100) has processing and bandwidth time for the transmission. When the Bluetooth® communication device (FIG. 1, 100) cannot transmit the data traffic due to processing restraints, the data traffic is delayed for transmission at a later time. Priority four (443) traffic may be delayed, but is not lost.

Figure 5:
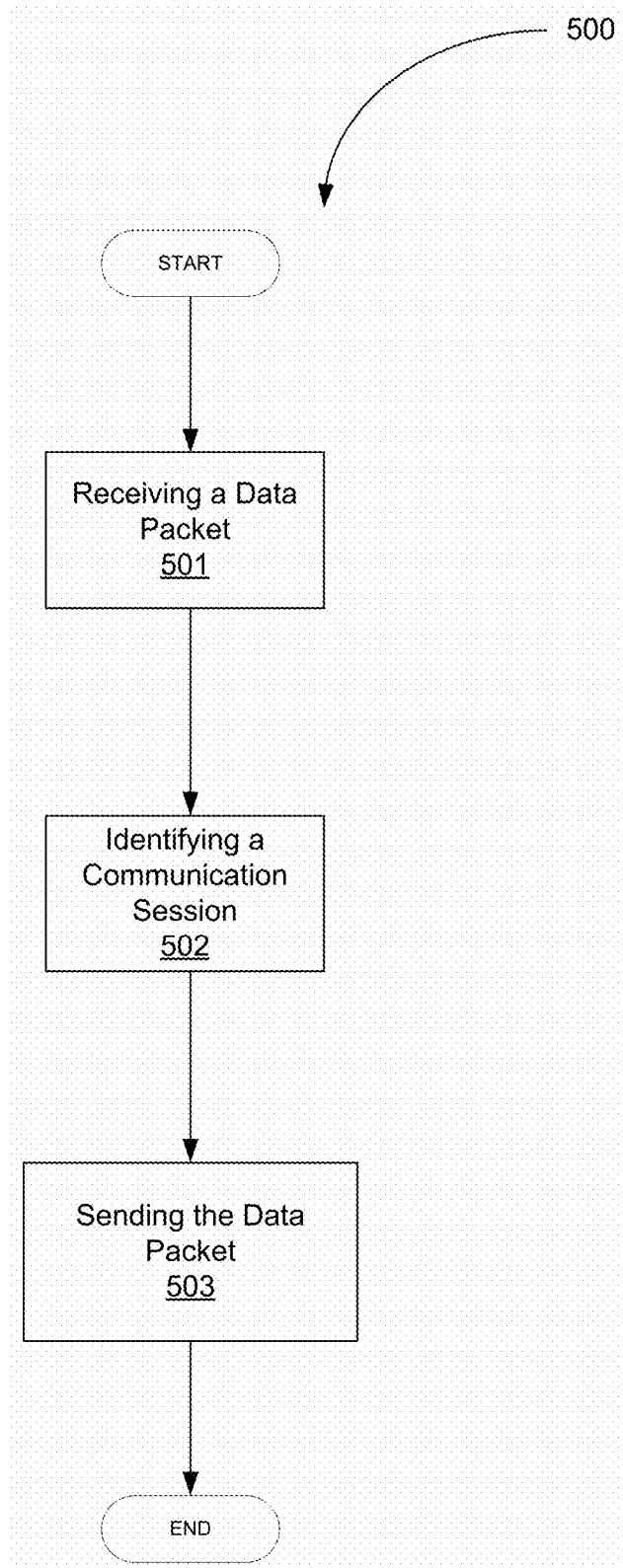
FIG. 5 illustrates a method for distributing data using a Bluetooth® Communication Distributor.

FIG. 5 illustrates a method (500) for distributing data to a number of client devices using an apparatus for distributing data using Bluetooth® communication protocols. The method includes receiving (501) a data packet, identifying (502) a communication session (502), and sending (503) the data packet.

The method (500) includes receiving (501) from an originating device, a data packet. The data packet includes data to be sent to a client device. Receiving the data packet may identify a device from which the data packet is received.

The method (500) includes identifying (502), based on the data packet, a communication session. The communication session provides information on communication of the data packet to the client device. Identifying the communication session may include identification of the originating device, identification of the client device, identification of the type of data being transmitted, and/or configuration parameters established by a user at the connection of either the originating device or the client device.

The method (500) includes sending, using at least one of a plurality of device antennas, the data packet to a client device. Sending the data packet to a client device may send identical data to a number of client devices.

An overall example according to FIG. 5 will now be given. Audio traffic is received from an originating device. The audio traffic indicates a pseudo-device that is to receive the audio traffic.

A communication session is identified based on the audio traffic and the pseudo-device. The pseudo-device indicates that the audio traffic is to be replicated to two separate client devices. The Bluetooth® communication distributor creates two transmissions of the audio traffic to two different client devices.

The Bluetooth® communication distributor then sends the audio traffic to each of the client devices using at least one of the plurality of device antennas. At least one of the originator antennas and or the device antennas may comprise a helical microstrip antenna as disclosed in co-pending U.S. patent application Ser. No. 15/391,071, entitled Broadband Helical Microstrip Antenna, teachings of which are incorporated herein in their entirety by this reference.

Figure 6:
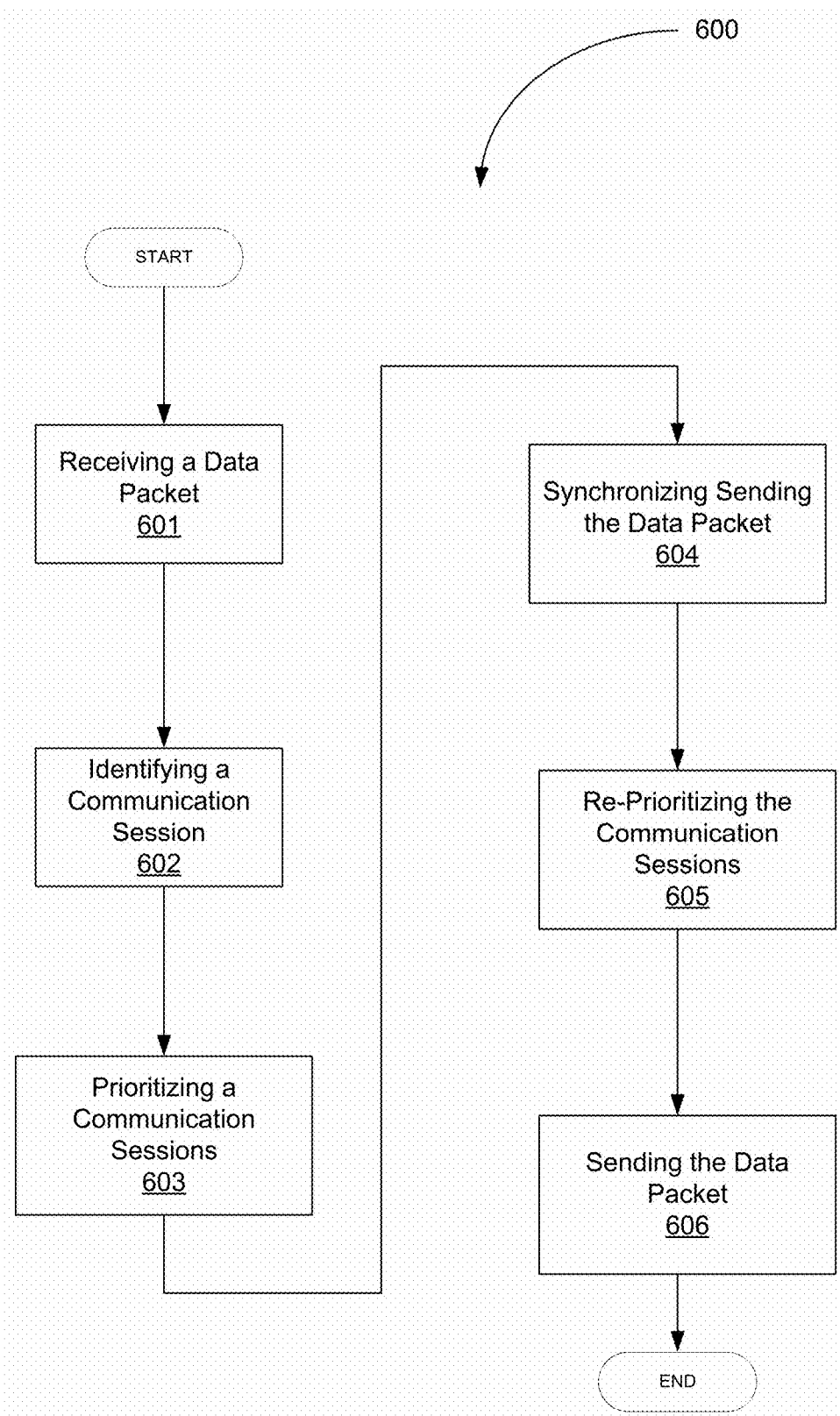
FIG. 6 illustrates a method for distributing data using a Bluetooth® Communication Distributor.

FIG. 6 illustrates a method (600) for transmitting data traffic using a Bluetooth® communication distributor. The method (600) includes receiving (601) a data packet, identifying (602) a communication session, prioritizing (603) a communication session, synchronizing (604) sending the data packet, reprioritizing (605) the communication session, and sending (606) the data packet.

As described above, the method (600), includes receiving (601), from an originating device a data packet. The data packet includes data to be sent to a client device. The method (600) includes identifying (602), based on the data packet, a communication session providing information on communication of the data packet to the client device.

The method (600) includes prioritizing (603) a plurality of communication sessions. The communication sessions may be prioritized based on the type of data to be transmitted using each of the plurality of communication sessions. Prioritizing the plurality of communication sessions may create an ordering of the plurality of communication sessions.

The method (600) includes synchronizing (604) sending the data packet to a plurality of client devices. The synchronizing (604) may provide synchronized arrival of the data packets at the client devices.

The method (600) includes reprioritizing (605) the communication sessions. Reprioritizing (605) the communication sessions may be based on data traffic in a plurality of communication sessions.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

The invention claimed is:

1. An apparatus for distributing data using a short-range wireless interconnection protocol for electronic devices, the apparatus comprising:
   a printed circuit board (PCB) having a first planar side and a second planar side;
   a processor;
   a communication bus, communicatively connected to the processor;
   a number of originator antennas, communicatively connected to the communication bus, each of the number of originator antennas communicating with an originating device;
   the number of originator antennas mounted parallel and opposite each other on the first and second sides of the PCB, the respective originator antennas comprising spaced apart non-linear antenna segments connected respectively through openings in the PCB;
   the middle non-linear antenna segments forming connecting legs of a "V" shaped middle segment, the legs connected to a middle opening in the PCB leading to a ground plane and driving circuitry;
   a plurality of device antennas, communicatively connected to the communication bus, each of the plurality of device antennas communicating with a number of client devices; and
   a non-transitory storage medium, the non-transitory storage medium comprising:
      a receive module, the receive module receiving a data packet using one of the number of originator antennas;
      a session identify module, the session identify module identifying at least one communication session with at least one remote device associated with one of the plurality of device antennas;
      a send module, the send module sending the data packet to the at least one remote device associated with one of the plurality of device antennas.

2. The apparatus of claim 1, wherein the non-transitory storage medium further comprises a prioritize module, to prioritize the at least one communication session.

3. The apparatus of claim 2, wherein the prioritize module prioritizes the at least one communication session based on a type of data to be transmitted using each of the at least one communication sessions.

4. The apparatus of claim 2, wherein the prioritize module creates an ordering of the at least one communication sessions.

5. The apparatus of claim 2, wherein the prioritize module prioritizes the at least one communication session into a number of priority categories.

6. The apparatus of claim 5, wherein the send module sends the data packet to each of the at least one communication session in the priority category.

7. The apparatus of claim 2, wherein the non-transitory storage medium further comprises a re-prioritize module, to re-prioritize the at least one communication session.

8. The apparatus of claim 7, wherein the re-prioritize module reprioritizes based on data traffic on the at least one communication session.

9. The apparatus of claim 2, wherein the non-transitory storage medium further comprises a synchronization module, where the synchronization module synchronizes sending the data packet to the at least one remote device.

10. The apparatus of claim 9, where in the synchronization module synchronizes sending the data packet to provide synchronized arrival at the client devices.

11. The apparatus of claim 1, wherein at least one of the originator antennas and or the device antennas comprise a helical microstrip antenna.

12. A method of distributing data to a number of client devices using an apparatus for distributing data using a short-range wireless interconnection protocol for electronic devices, the method comprising:
   receiving, from an originating device, comprising a number of parallel originator antennas mounted opposite each other on the first and second sides of a PCB, the respective originator antennas comprising spaced apart non-linear antenna segments connected respectively through openings in the PCB, the middle non-linear antenna segments forming connecting legs of a "V" shaped middle segment, the legs connected to a middle opening in the PCB leading to a ground plane and driving circuitry; a data packet, the data packet comprising data to be sent to a client device;
   identifying, based on the data packet, a communication session, the communication session providing information on communication of the data packet to the client device;
   sending, using the at least one of a plurality of device antennas, the data packet to a client device.

13. The method of claim 12, further comprising prioritizing a plurality of communication sessions.

14. The method of claim 13, wherein prioritizing the plurality of communication sessions prioritizes based on a type of data to be transmitted using each of the plurality of communication sessions.

15. The method of claim 13, wherein prioritizing the plurality of communication sessions creates an ordering of the plurality of communication sessions.

16. The method of claim 13, wherein prioritizing the at least one communication session prioritizes the at least one communication session into a number of priority categories.

17. The method of claim 16, wherein the sending of the data packet to a client device sends the data packet to each of the at least one communication sessions in a priority category.

18. The method of claim 13, further comprising re-prioritizing the at least one communication session.

19. The method of claim 18, wherein the re-prioritizing re-prioritizes based on data traffic on the at least one communication session.

20. The method of claim 13, further comprising synchronizing sending the data packet to the plurality of client devices and wherein synchronizing sending the data packet provides synchronized arrival at the client devices.

* * * * *